United States Patent [19]

Dissett et al.

[11] 4,365,524

[45] Dec. 28, 1982

[54] TORQUE-PROPORTIONING DIFFERENTIAL WITH WEDGE BLOCK THRUST BEARING MEANS

[75] Inventors: Walter L. Dissett, Southfield; James R. Bawks, St. Clair Shores, both of Mich.

[73] Assignee: Tractech, Inc., Detroit, Mich.

[21] Appl. No.: 184,393

[22] Filed: Sep. 5, 1980

[51] Int. Cl.³ .............................................. F16H 1/38
[52] U.S. Cl. ...................................... 74/715; 74/396; 74/606 R
[58] Field of Search ................. 74/711, 714, 715, 396, 74/606 R

[56] References Cited

U.S. PATENT DOCUMENTS

| | | | |
|---|---|---|---|
| 2,462,000 | 2/1949 | Randall | 74/715 X |
| 2,972,265 | 2/1961 | Walter | 74/715 X |
| 3,095,761 | 7/1963 | Hilado | 74/715 |
| 3,706,239 | 12/1972 | Myers | 74/715 |
| 3,899,939 | 8/1975 | Hilado | 74/715 |

OTHER PUBLICATIONS

Tractech, Inc. Sales Bulletin, "TRUETRAC It Keeps You on the Move Torque Proportioning Differential", Tractech, Inc., Aug. 1979.
Dymeer News Bulletin NB#14-19, 8-31-79.

*Primary Examiner*—Allan D. Herrmann
*Attorney, Agent, or Firm*—Laubscher, Philpitt & Laubscher

[57] ABSTRACT

A differential apparatus is disclosed of the type including pairs of helical differential pinions for transmitting torque from a rotatably driven differential carrier housing to a pair of side gears splined to a pair of output shafts, respectively, characterized by the provision of a collapsible and expansible wedge block spacer assembly for maintaining the output shafts in spaced relation and for reacting to axially inwardly directed thrust forces. During assembly of the differential apparatus, the spacer block is introduced, when in a collapsed condition, into the housing via a transverse access opening, to a position between the output shafts, whereupon the wedge block assembly is axially expanded into supporting engagement with the adjacent ends of the output shafts. The housing includes three sections, a pair of end cover sections being arranged on opposite sides of a center section of contoured configuration.

4 Claims, 20 Drawing Figures

TORQUE-PROPORTIONING DIFFERENTIAL WITH WEDGE BLOCK THRUST BEARING MEANS

BRIEF DESCRIPTION OF THE PRIOR ART

In the prior U.S. Pat. of Albert F. Myers No. 3,706,239 of Dec. 19, 1972 (which is assigned to the same assignee as the present invention), a differential mechanism of the helical pinion differential gear type is disclosed having internal bias torque as relative motion occurs due to the differentiating action of the mechanism. The differential carrier housing includes two sections each having pinion recesses in the form of internal cylindrical cavities parallel with the driven axle shafts. Thus, the cavities in one housing part register and align with the cavities in the other housing part so that when the parts are joined together, a single cylindrical cavity for each differential pinion is provided.

The pinion cavities are arranged in discrete pairs, one cavity of each pair intersecting the other cavity of that pair. When the pinions are mounted within their respective cavities, the pinions of each discrete pair mesh with each other. One pinion of each pair meshes in turn with one side gear, and the other meshes with the adjacent side gear. The pinions of each pair are offset axially with respect to each other. The side gears are journaled within a centrally disposed pinion opening in the differential carrier housing.

The present invention was developed to provide an improved differential apparatus of simplified, less costly, light weight design that is stronger and more durable in operation, that positively maintains the output shafts and side gears in a desired spaced relation, and that positively supports the components against the axial thrust forces applied thereto during differential operation.

SUMMARY OF THE INVENTION

Accordingly, a primary object of the present invention is to provide an improved differential mechanism of the type including pairs of helical differential pinions for transmitting torque from the rotatably driven differential carrier housing to the side gears that are splined to the output shafts, characterized in that the pinions are mounted in corresponding bores formed in opposite ends of a housing center body section that is arranged between a pair of housing end cover sections. The side gears are similarly mounted in bores contained in opposite ends of the center body section, which section contains a central transverse access opening for introducing a wedge block thrust bearing assembly—when in a collapsed (or separated) condition—between the output axles and the side gears splined thereto. The wedge block thrust bearing assembly is operated to its expanded condition into supporting engagement with the adjacent ends of the output axles.

According to a further object of the invention, the housing center body section is contoured to define at each end first recessed portions opposite the pinion bores contained in the other end of the body section, respectively, and also to define second recessed portions that extend longitudinally in the outer periphery of the section between cooperating pairs of the pinion bores, respectively, thereby reducing the size, weight and cost of the differential without sacrificing strength of durability in operation.

The improved differential maintains traction when one wheel starts to slip, affords positive gear action without the use of friction plates, and requires no special lubricants or adjustments. The new torque-proportioning (limited-slip) differential is designed for medium-duty applications. Smooth and quiet in operation, it performs like a standard or "open" differential in normal driving when traction is not a problem—with no "chatter" and no effect on steering even when used in a front-drive-steer axle in a light vehicle. When one wheel loses traction, the unique gear geometry of the geometry of the differential automatically develops a controlled spin resistance between the pinion gears and the case, so smoothly that the driver does not sense steering resistance, even when the unit is installed in the front axle. Torque is transferred (biased) to the wheel with the most solid footing.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
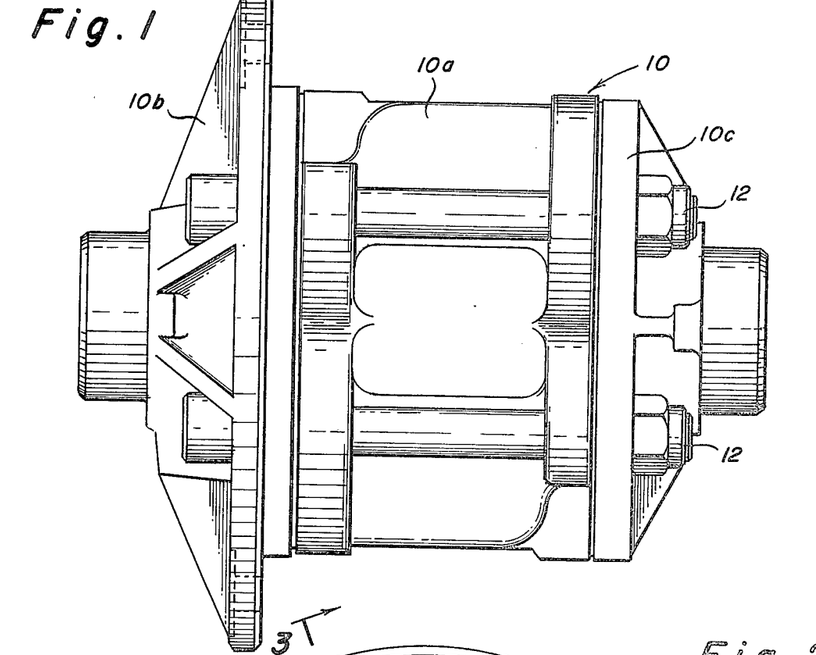
FIG. 1 is a side elevation view of the differential mechanism of the present invention.
Figure 2:
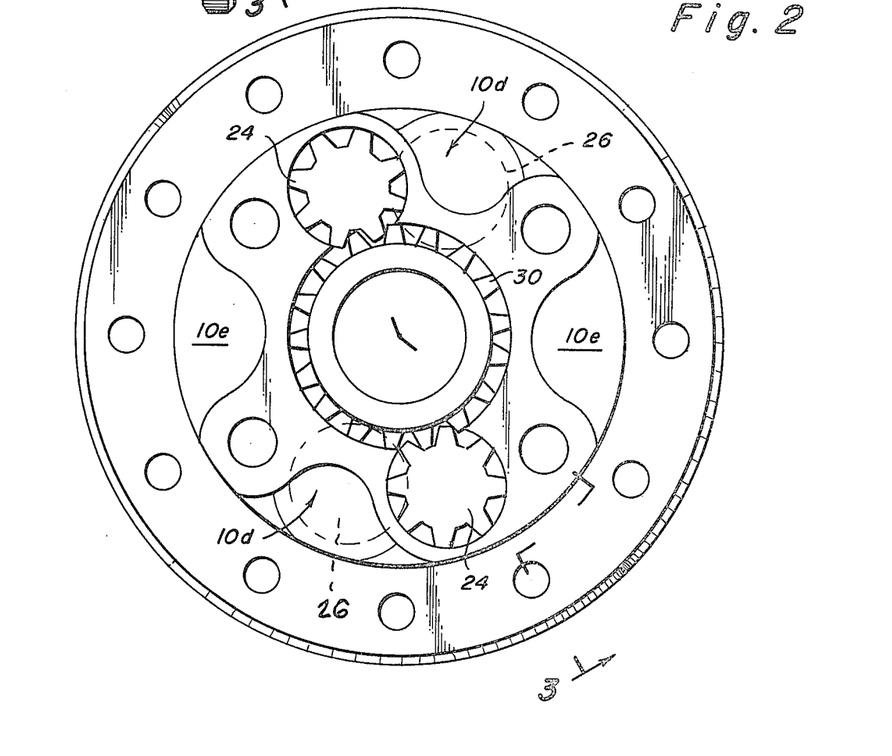
FIG. 2 is a right hand end view of the apparatus of FIG. 1 with the plain cover member removed.
Figure 3:
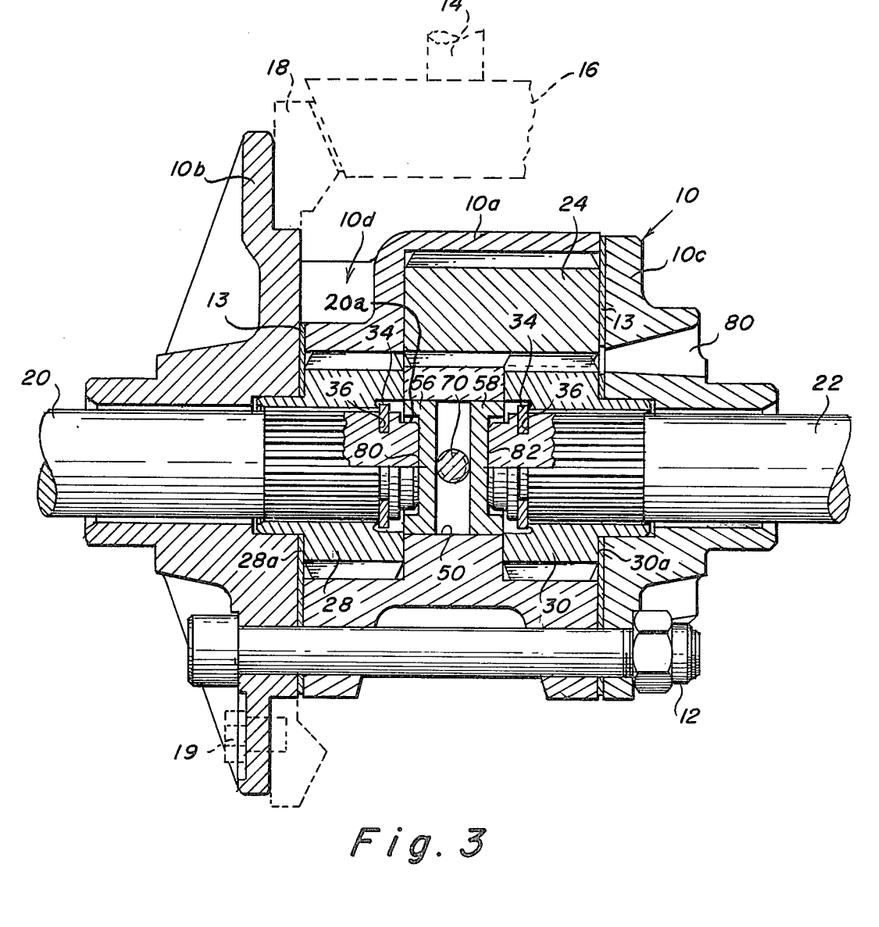
FIG. 3 is a sectional view taken along line 3—3 of FIG. 2.

Referring first more particularly to FIGS. 1-3, the differential carrier housing 10 includes a center section 10a, a flanged cover section 10b, and a plain cover section 10c, which sections are rigidly connected by bolts 12. In accordance with a first feature of the invention, thrust washers 13 (FIG. 5) are mounted between the center housing section 10a and the end cover sections 10b and 10c, respectively, which thrust washers serve to support the helical differential pinions 24 and 26 and the remote annular end surfaces 28a and 30a of side gears 28 and 30, as will be described in greater detail below.

The differential carrier housing 10 is rotatably driven from drive shaft 14 (FIG. 3) via driving pinion 16 and ring gear 18 bolted to the housing by bolts 19, thereby to normally drive output shafts on axles 20 and 22 via pairs of cooperating left and right hand helical pinion gears 24 and 26, respectively, and side gears 28 and 30 non-rotatably splined on the output shafts 20 and 22, respectively.

Figure 4:
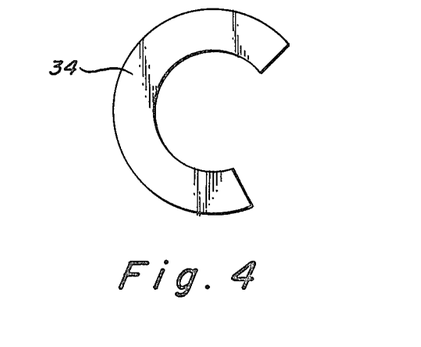
FIGS. 4 and 5 are end views of the C-shaped lock members and the thrust washers, respectively, of FIG. 3.

According to another feature of the invention, outward displacement of the output shafts 20 and 22 relative to the side gears 28 and 30, respectively, is prevented by C-shaped lock members 34 (FIG. 4) that are resiliently retained within corresponding grooves 36 formed within the splined end portions of the output shafts.

Figure 8:
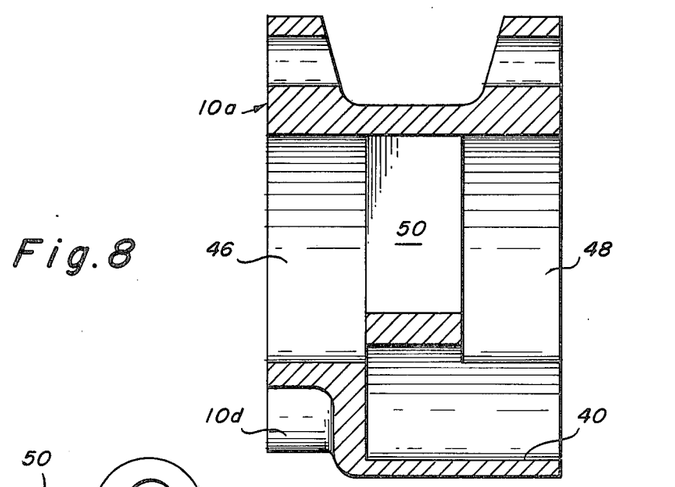
FIG. 8 is a sectional view taken along line 8—8 of FIG. 6.
Figure 9:
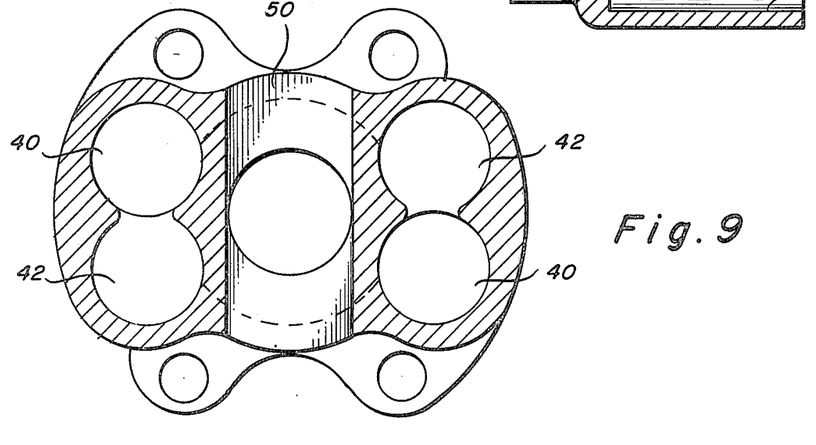
FIG. 9 is a sectional view taken along line 9—9 of FIG. 7.

The pinions 24 and 26 are freely rotatably mounted within corresponding longitudinal bores 40 and 42 contained in opposite ends of the central body portion 10b, respectively, which bores are in communication at their adjacent ends as shown in FIG. 9, thereby to permit enmeshing engagement between the adjacent end portions of the helical differential gears 24 and 26. The side gears 28 and 30 are rotatably mounted within bores 46 and 48 (FIG. 8), respectively, formed in opposite ends of the central body portion.

Figure 10:
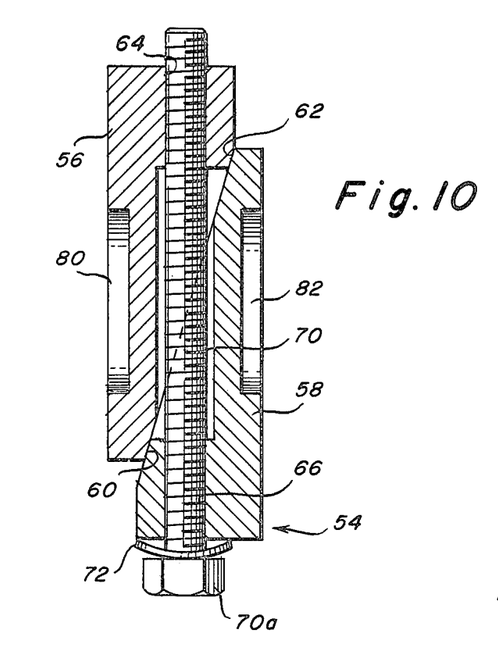
FIG. 10 is a longitudinal sectional view of the wedge block spacer assembly of FIG. 3.
Figure 11:
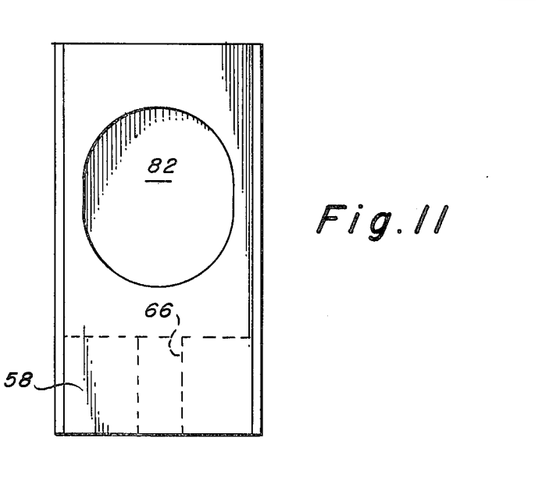
FIGS. 11 and 12 are end elevation and bottom views, respectively, of one of the wedge blocks of FIG. 10.
Figure 12:
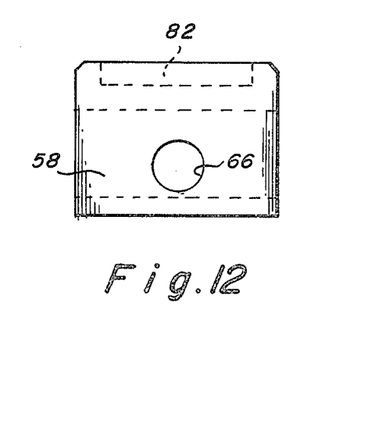
Figure 13:
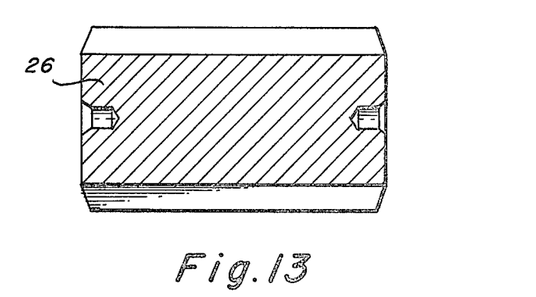
FIGS. 13 and 14 are sectional and end views, respectively, of one of the helical pinions of FIG. 3.

In accordance with a characterizing feature of the invention, the housing center body portion 10a contains a centrally arranged transversely extending through opening 50 of rectangular cross section that is in communication with bores 46 and 48, as shown in FIG. 8. Mounted within this bore is an expansible and collapsible wedge block spacer assembly 54 (FIG. 10) that includes a pair of wedge block members 56 and 58 having cooperating inclined adjacent wedge surfaces 60 and 62, respectively, and aligned bores 64 and 66, respectively. The bore 64 is threaded for connection with the free end of a bolt 70 the head portion 70a of which engages a concentrically mounted annular bellevue washer 72, which washer maintains a load on the bolt and compensates for thermal material change. The bore 66 is oversized and has a diameter greater than that of the threaded portion of the bolt 70. The remote faces of the wedge blocks contain elliptical recesses 80 and 82, respectively, that receive the reduced adjacent end portions 20a and 22a of the output shafts 20 and 22, respectively, as shown in FIG. 3. Thus, upon tightening of bolt 70, wedge block members 56 and 58 are drawn longitudinally together and, owing to the cooperation between the inclined surfaces 60 and 62, effect separation of the remote block faces containing recesses 80 and 82, thereby to effect supporting engagement with the adjacent end faces of the output shafts.

Figure 14:
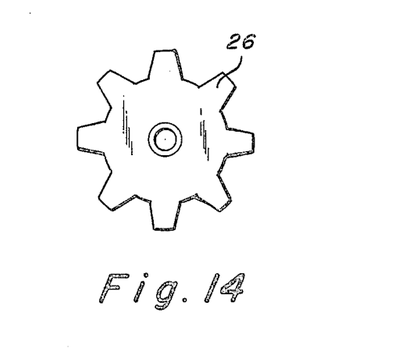
Figure 15:
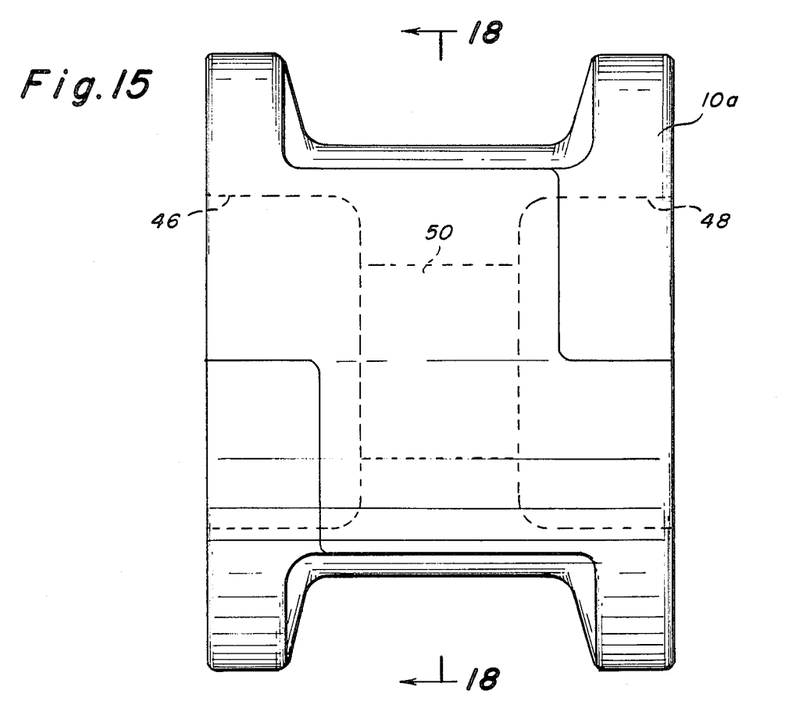
FIGS. 15-17 are side elevation, top plan and end views of the casting from which the housing central body portion of FIGS. 6-8 is formed.
Figure 16:
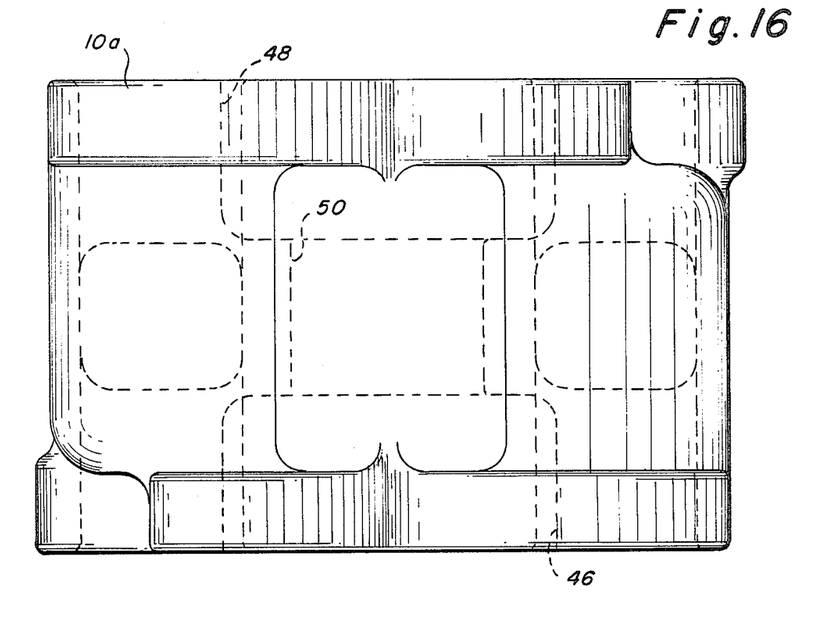
Figure 17:
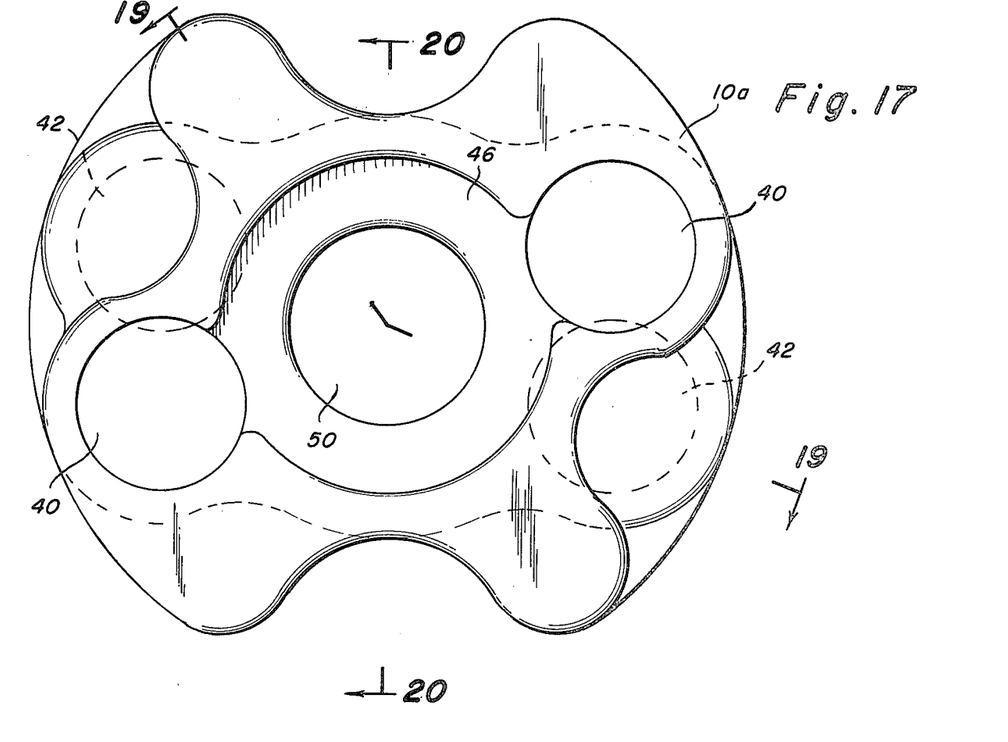
Figure 18:
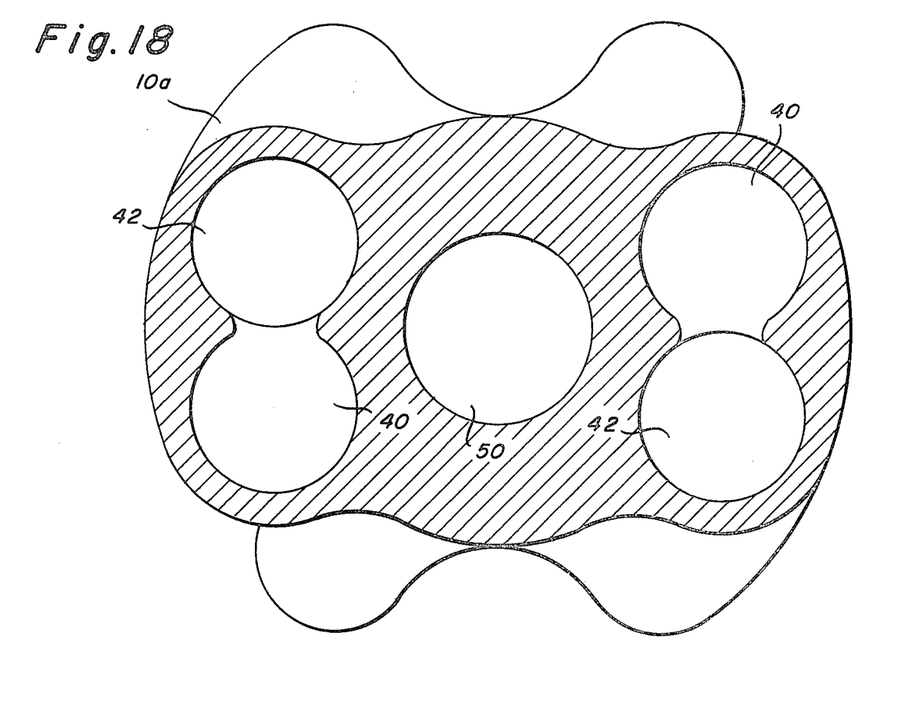
FIG. 18 is a sectional view taken along line 18—18 of FIG. 15.
Figure 19:
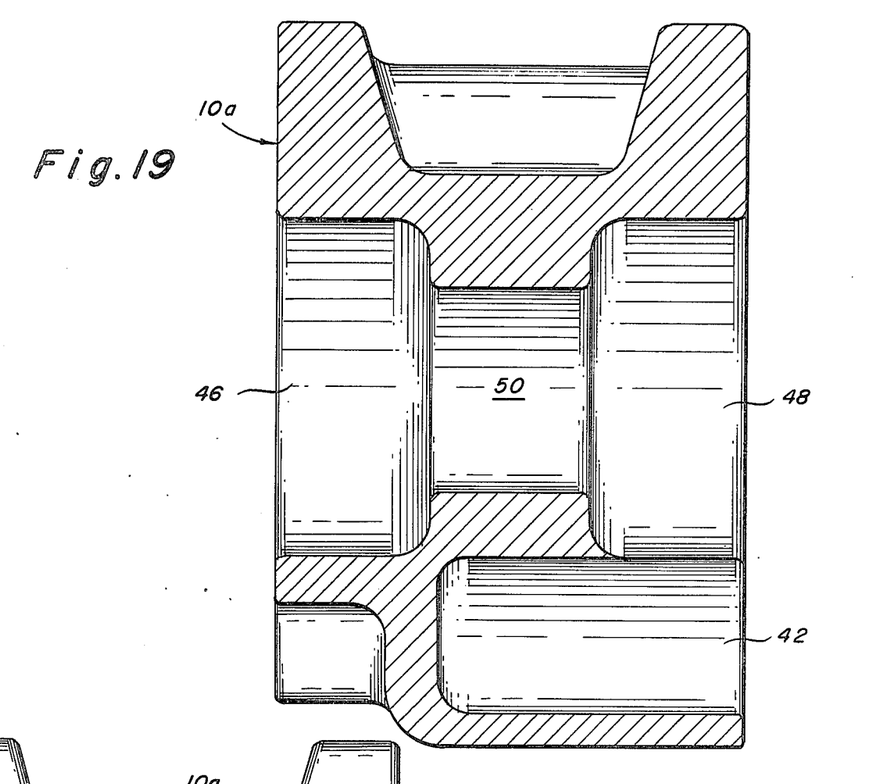
FIGS. 19 and 20 are sectional views taken along lines 19—19 and 20—20, respectively, of FIG. 17.
Figure 20:
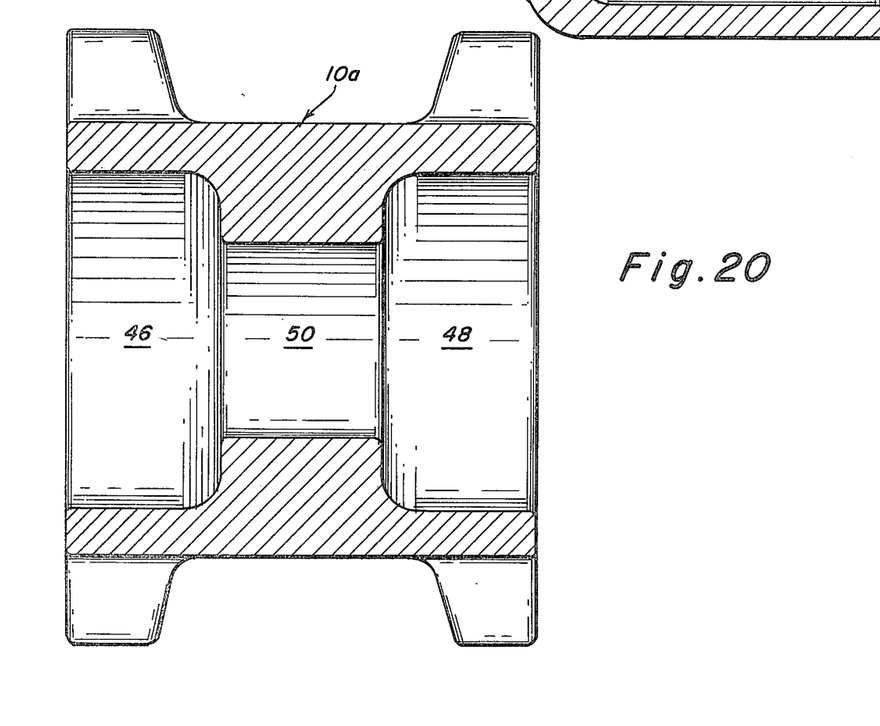

In the illustrated embodiment, the differential pinions 24 and 26 have helical gear teeth of right and left hand thread, respectively, each gear normally having eight helical teeth (FIG. 14) with a pressure angle of about 30° and a helix angle of about 40°.

Figure 5:
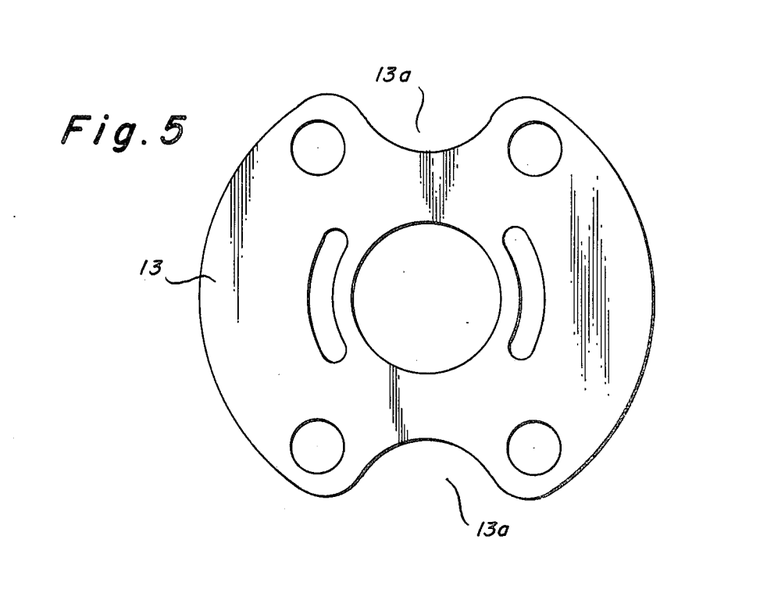
Figure 6:
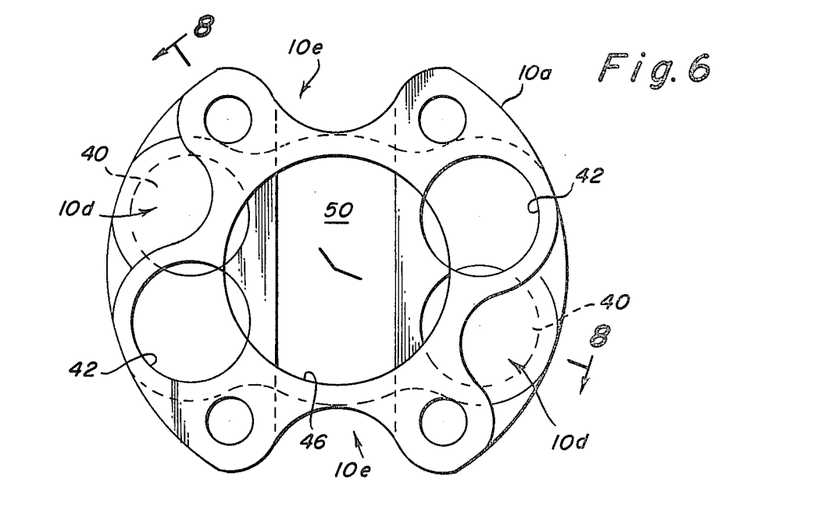
FIGS. 6 and 7 are left hand end and top elevation views, respectively, of the center body portion of the housing of FIGS. 1-3.
Figure 7:
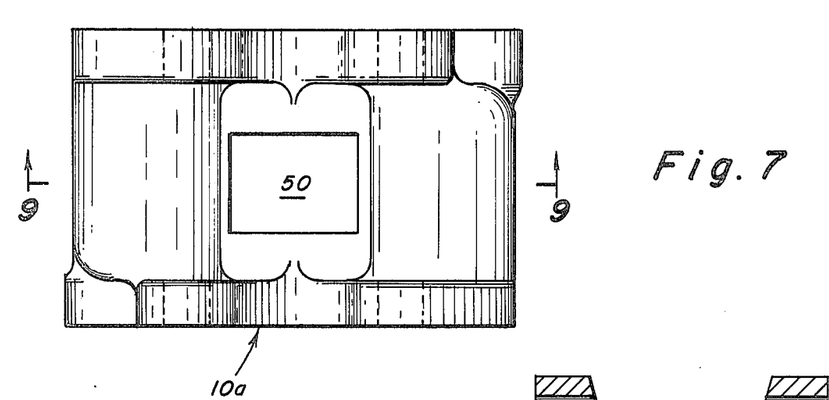

As shown in FIGS. 2, 3, 6 and 8, instead of being of uniform cylindrical configuration, the housing center body portion 10a is contoured at each end to define reduced portions or recesses 10d opposite the closed ends of the pinion bores 40 and 42. Similarly, the central body portion 10a contains on its outer periphery a pair of diametrically arranged longitudinal recesses 10e, as shown in FIGS. 2 and 6. The thrust washers 13 are provided with corresponding recesses 13a, as shown in FIG. 5. This contoured configuration of the central body portion (and the thrust washers) reduces the total weight of the differential apparatus, decreases manufacturing cost, and achieves improved heat dissipation during normal use of the differential, without any reduction in the strength or durability of the apparatus. FIGS. 15-20 illustrate the casting from which the housing center body portion 10a of FIGS. 6-8 is formed.

OPERATION

Referring to FIG. 3, assume that the side gears 28 and 30 are splined to the output shafts or axles 20 and 22; and that the C-shaped locking members 34 are snapped into the circumferential grooves 36 formed in the output shafts. After the ring gear 18 is bolted by bolts 19 to the flange portion of cover section 10b, the wedge block assembly 54, when in the untightened disassembled or collapsed condition, is introduced within the housing center body section 10a via access opening 50, whereupon bolt 70 is tightened to draw the wedge blocks 56 and 58 longitudinally together. Owing to the wedging action produced by the inclined surfaces 60 and 62, the spacer means is expanded to cause the remote wall surfaces containing the recesses 80 and 82 to be separated, thereby engaging and supporting the reduced end portions of the output shafts. In addition to permitting the wedge block spacer means 54 to be installed in the case body after the ring gear has been mounted on the differential assembly, the wedge block spacer means serves as a reactionary means against which the thrust forces generated by the side gears during differential operation are directed and to keep the output shafts from moving to the center of the differential.

Upon rotation of the drive shaft 14, output shafts 20 and 22 are normally driven at the same speed via drive pinion 16, ring gear 18, housing 10, helical pinion gears 24 and 26, and side gears 28 and 30. Thus, the drive torque applied to ring gear 18 is distributed through two parallel torque delivery paths which include the meshing pairs of differential pinions 24 and 26, thereby introduces radial gear tooth loading on the pinions, which results in frictional resistance owing to rotation, thus introducing an inherent bias torque. Because of the helix angle on the pinions 24 and 26 and on the companion side gears, a thrust force is produced on the pinions causing frictional resistance owing to the engagement of the pinions with the ends of their respective pinion cavities. Thrust forces are also introduced on the wedge block spacer means 54 as a consequence of the axial gear tooth loading in the two side gears. Finally, a further thrust force on the pinion is produced by the axial gear tooth loads, which thrust force is transmitted to the thrust washers 13 (FIGS. 3 and 5) arranged between the housing center body portion 10a and the cover portions 10b and 10c, respectively. It will be seen that the thrust washers receive the axial thrust forces of both the pinions 24 and 26 and the end surfaces 28a and 30a of the side gears 28 and 30, wherein a reverse mode, respectively.

Under normal conditions of equal tractive effort at each tire, equal resistance force is applied by each side gear so that the pinions do not differentiate. However, when one side gear applies more resistance to the torque driving the pinion (due to dissimilar ground coefficients), its mating pinions tend to separate from the side gear and wedge into the pockets in the case. As the input torque increases, the wedging of the pinions in the case also increases. As the coefficient of friction under each of the drive wheels varies, the amount of torque distributed to each wheel is automatically proportioned so that wheel slip under the tire with the poorest traction will be controlled.

With the differential of the present invention, torque bias increases as the input torque increases. This is a desirable characteristic because at high speeds the differential sees low torque and functions like a standard differential. However, at low speeds and high torque conditions, the differential automatically biases more torque to the drive wheel that has most resistance to wheel-spinout.

The differential requires a certain amount of resistance at the ground in order to start the "biasing" action—approximately the amount developed by a light-truck tire on snow. A differential will not bias if the spinning wheel is off the ground. If the coefficient is below 0.1 or even 0 (represents a wheel off the ground), the driver simply applies the brakes lightly until enough torque resistance is developed to start biasing the differential and move the vehicle.

Suitable lubrication oil to provide a normal lubrication oil film can be introduced into the pinion and gear cavities via lubrication oil port 18 contained in cover portion 10c.

The differential is a torque-sensitive, torque-biasing class of traction differential. It consists of two distinct sets of planetary gearsets. The side gears are the sun gears, and the pinion gears are the planetary gears. All are the helical type located on parallel axes. Each side gear meshes with a mating pinion of the opposite planetary gearset. All gears are supported in pockets of the case.

The differential case is designed within the same exterior dimensions as the standard case, so that identical installation methods may be employed for ring gear/pinion backlash and differential bearing loading.

By varying the helix angle of the gear teeth, the thrust force of the pinions to the case can be increased or decreased. By varying the pressure angle of the gear teeth, the separating force of the pinions relative to the side gears can be increased or decreased. By varying the number of pinion sets, torque capacity of the differential assembly can be increased or decreased. By varying the helix angle and pressure angle of the gear teeth, a desired torque distribution or torque bias can be obtained.

While the preferred embodiment has been illustrated and described, other changes and modifications may be made without deviating from the inventive concepts set forth above.

What is claimed is:

1. Gear differential apparatus for supplying driving torque from a drive shaft to a pair of aligned output shafts, comprising
    (a) a sectional differential carrier housing (10) adapted to be rotatably driven by the drive shaft, said housing including a center body section (10a) and a pair of end cover sections (10b, 10c) connected on opposite sides of said center body section;
    (b) a pair of annular helical side gears (28, 30) journalled in corresponding aligned bores contained in opposite ends of said center body section, respectively, said side gears having splined inner circumferences for non-rotatable connection with the output shafts when the adjacent ends of the shafts extend in axially spaced relation through aligned openings contained in said end cover sections, respectively;
    (c) lock means (34) preventing axial outward displacement of the output shafts relative to the side gears, respectively;
    (d) a plurality of pairs of differential helical pinions (24, 26) having threads of opposite hands, respectively, the pinions of each pair being mounted with an outside diameter running fit within bores (40, 42) contained in opposite ends of said center housing section, respectively, the adjacent ends of said bores being in communication and the adjacent ends of said differential helical pinions being in overlapping enmeshing engagement with each other, said pinions having axes parallel with the axes of, and being in enmeshing engagement with, said side gears, respectively, whereby the torque transmitted through said differential mechanism introduces gear tooth loads on said pinions which cause a frictional torque resistance as the pinions rotate within their respective pinion cavities, thereby introducing a torque bias in the differential mechanism; and
    (e) spacer means (54) arranged between said side gears for maintaining said output shafts in spaced relation;
    (f) said housing center body section containing at each end first recessed portions (10d) opposite the helical pinion bores (40, 42) formed in the opposite ends of the center body section, respectively, and second recessed portions (10e) extending longitudinally of the center body section between each pair of helical pinion bores.

2. Gear differential apparatus for supplying driving torque from a drive shaft to a pair of aligned output shafts, comprising
    (a) a sectional differential carrier housing (10) adapted to be rotatably driven by the drive shaft, said housing including a center body section (10a), and a pair of end cover sections (10b, 10c) connected on opposite sides of said center body section, said center body section containing a central transverse access opening (50) of rectangular cross-sectional configuration;
    (b) a pair of annular helical side gears (28, 30) journalled in corresponding aligned bores contained in opposite ends of said center body section, respectively, said side gears having splined inner circumferences for non-rotatable connection with the output shafts when the adjacent ends of the shafts extend in axially spaced relation through aligned openings contained in said end cover sections, respectively, the side surfaces of said access opening being parallel with and normal to the axes of said side gears, respectively;
    (c) lock means (34) preventing axial outward displacement of the output shafts relative to the side gears, respectively;
    (d) a plurality of pairs of differential helical pinions (24, 26) having threads of opposite hands, respectively, the pinions of each pair being mounted with an outside diameter running fit within bores (40, 42) contained in opposite ends of said center housing section, respectively, the adjacent ends of said bores being in communication and the adjacent ends of said differential helical pinions being in overlapping enmeshing engagement with each other, said pinions having axes parallel with the axes of, and being in enmeshing engagement with, said side gears, respectively, whereby the torque transmitted through said differential mechanism introduces gear tooth loads on said pinions which cause a frictional torque resistance as the pinions rotate within their respective pinion cavities, thereby introducing a torque bias in the differential mechanism; and (e) expansible and collapsible spacer means (54) arranged between said side gears for maintaining the output shafts in axially spaced relation, said spacer means comprising wedge block means including a pair of wedge blocks (56, 58) each arranged normal to the common axis of said side gears, said wedge blocks having cooperating inclined wedge surfaces, and bolt means (70) for axially displacing said wedge blocks between collapsed and expanded conditions relative to each other, said spacer means, when in the collapsed condition, being insertable into said differential carrier housing via said central transverse access opening, said spacer means, when in the expanded condition, being in engagement with the adjacent ends of the output shafts to absorb the inwardly directed axial thrust applied to said side gears and said shafts;

(f) said housing central body section containing at opposite ends first recessed portions (10d) opposite the helical pinion bores (40, 42) formed in the other ends of said central body section, respectively, thereby to reduce the size and weight of the central body section.

3. Apparatus as defined in claim 2, wherein said housing central body section further contains on its outer periphery longitudinally extending second recessed portions (10e) arranged between the cooperating pairs of helical pinion bores (40, 42) respectively, thereby to reduce further the size and weight of the central body section.

4. Apparatus as defined in claim 3, and further including a pair of thrust washers (13) arranged between said housing center body member and said end cover members, respectively, said side gears having at their remote ends annular shoulder surfaces (28a, 30a) in abutting engagement with said thrust washers, respectively, said thrust washers containing adjacent their outer peripheries recesses (13a) opposite the first recessed portions in said housing center body section.

* * * * *